Patented May 9, 1944

UNITED STATES PATENT OFFICE 2,348,417

ARSANILIC ACID AZO SULPHONAMIDE COMPOUND

Frederick Proescher, San Jose, and Vladimir M. Sycheff, Palo Alto, Calif., assignors to Research Corporation, New York, N. Y., a corporation of New York No Drawing. Application May 21, 1941, Serial No. 394,560

3 Claims. (Cl. 260—149)

This invention relates to azo compounds having chemotherapeutic properties.

An object of this invention is to provide azo compounds which display bactericidal action.

The products of this invention comprise a radical selected from the group consisting of the sulphanilamide radical and radicals of its $N^1$-substituted derivatives (according to Northey, Chem. Rev. 27, No. 1, 85 et seq. 1940) linked by a diazo group to an arsanilic acid radical. Exemplary of the first-mentioned group are radicals of compounds such as sulphanilamide and sulphapyridine, the radical being that remaining after removal of the amino group from the molecule. Exemplary of the arsanilic acid radical are radicals of compounds such as arsanilic acid (p-aminobenzene-arsonic acid) and salts thereof, for example, alkali metal salts and more particularly the sodium salt, such radicals being those remaining after removal of a hydrogen from the nucleus of arsanilic acid or one of its salts. The diazo group is linked to the nucleus of arsanilic acid or one of its salts in the ortho or meta position.

In a process of making the compounds of this invention sulphanilamide, or one of its $N^1$-substituted derivatives, is diazotized in a manner well known to the art. The diazo compound resulting is coupled with a coupling component comprising arsanilic acid and salts thereof, preferably the sodium salt of arsanilic acid, in the usual way to form the azo compounds of the invention.

The general structural formula of the compounds of this invention is:

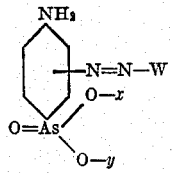

in which W is a radical of sulphanilamide or its $N^1$-substituted derivatives, the N directly linked to said radical as shown above being the $N^4$-nitrogen of the "sulpha" compound and $x$ and $y$ are hydrogen or a monovalent metal.

The following specific examples show several compounds of the invention and methods of preparing them, it being understood that the examples are merely illustrative of the invention.

Example 1

40 g. of sulphanilamide are diazotized with 20 g. of sodium nitrite and the diazonium salt is precipitated with sodium acetate. The precipitate is removed by filtration, washed with sodium acetate solution, and redissolved in water containing a small amount of sodium acetate.

50 g. of arsanilic acid are neutralized with sodium carbonate in water to form the sodium salt of arsanilic acid. The resulting solution of sodium arsanilate is added with constant stirring to the previously prepared solution of the diazonium salt of sulphanilamide. Coupling occurs. The sodium arsanilate-azo-benzenesulphonamide is precipitated from the resulting solution by saturating with sodium acetate. The precipitate is removed by filtration, washed with ice-cold water and dried at 50° C. The reaction results in the compound

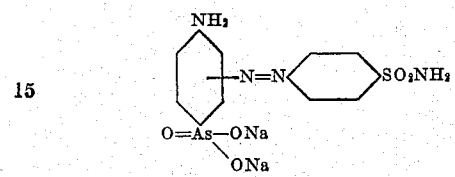

The compound has a light yellow color. It has no definite melting point, but melts with evolution of gas at about 240° C. It is soluble in water, propylene glycol, and in the methyl ether of ethylene glycol.

Example 2

Arsanilic acid - azo - benzenesulphonamide is made by a process similar to that described in Example 1, except that the arsanilic acid is not neutralized prior to coupling, and the sodium salt thereof is formed by neutralization of the compound with sodium carbonate.

Example 3

By a process similar to that disclosed in Example 1, arsanilic acid or sodium arsanilate is coupled to diazotized sulphapyridine. The following compound is formed:

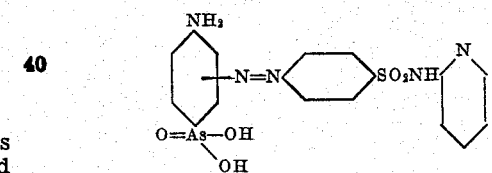

or the sodium salt thereof.

We claim:

1. An azo compound of the following general formula:

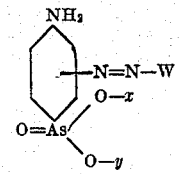

in which W is a radical of the group consisting of sulphanilamide and its $N^1$-substituted derivatives, the N directly linked to said radical being the $N^1$ nitrogen of the "sulpha" compound and $x$ and $y$ are selected from the group consisting of hydrogen and alkali metals.

2. An azo compound of the following formula:

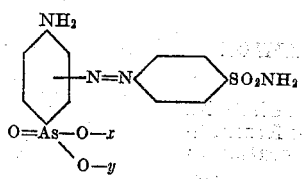

in which $x$ and $y$ are selected from the group consisting of hydrogen and alkali metals.

3. An azo compound of the following formula:

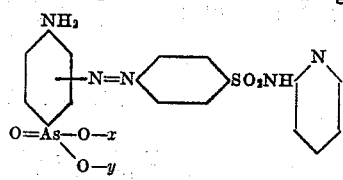

in which $x$ and $y$ are selected from the group consisting of hydrogen and alkali metals.

FREDERICK PROESCHER.
VLADIMIR M. SYCHEFF.